(12) United States Patent
Hendler et al.

(10) Patent No.: US 7,630,786 B2
(45) Date of Patent: Dec. 8, 2009

(54) MANUFACTURING PROCESS END POINT DETECTION

(75) Inventors: Lawrence Hendler, Cupertino, CA (US); Matthew Richter, Woodside, CA (US)

(73) Assignee: MKS Instruments, Inc., Andover, MA (US)

( * ) Notice: Subject to any disclaimer, the term of this patent is extended or adjusted under 35 U.S.C. 154(b) by 5 days.

(21) Appl. No.: 11/683,218

(22) Filed: Mar. 7, 2007

(65) Prior Publication Data

US 2008/0221720 A1 Sep. 11, 2008

(51) Int. Cl.
*G06F 19/00* (2006.01)
(52) U.S. Cl. ...................................... 700/108
(58) Field of Classification Search ............... 700/30, 700/32, 33, 51, 108, 109, 110
See application file for complete search history.

(56) References Cited

U.S. PATENT DOCUMENTS

| | | | | |
|---|---|---|---|---|
| 4,744,027 | A * | 5/1988 | Bayer et al. ................ | 705/7 |
| 4,914,563 | A * | 4/1990 | Karmarkar et al. ........... | 700/28 |
| 5,442,562 | A | 8/1995 | Hopkins et al. ............. | 700/108 |
| 5,479,340 | A | 12/1995 | Fox et al. .................... | 700/33 |
| 6,153,115 | A | 11/2000 | Le et al. ...................... | 216/60 |
| 6,442,445 | B1 | 8/2002 | Bunkofske et al. .......... | 700/108 |
| 6,830,939 | B2 | 12/2004 | Harvey et al. ................ | 438/8 |
| 2004/0055888 | A1 | 3/2004 | Wikiel et al. ................ | 205/81 |
| 2004/0083065 | A1 | 4/2004 | Daniel et al. ................ | 702/35 |
| 2004/0116814 | A1 | 6/2004 | Stranc et al. ................ | 600/473 |
| 2004/0228186 | A1 | 11/2004 | Kadota ...................... | 365/202 |
| 2005/0010374 | A1 * | 1/2005 | Li ................................ | 702/28 |
| 2005/0028932 | A1 | 2/2005 | Shekel et al. ............. | 156/345.15 |
| 2005/0037515 | A1 | 2/2005 | Nicholson et al. .......... | 436/173 |
| 2005/0045821 | A1 | 3/2005 | Noji et al. .................... | 250/311 |
| 2005/0130321 | A1 | 6/2005 | Nicholson et al. .......... | 436/518 |

OTHER PUBLICATIONS

Santos et al.; "Visualizing and Invetigating Multidimensional Functions";2002; Joint Eurographics-IEEE TCVG Symposium on Visualization; pp. 173-182.*

Goodlin et al., "Simultaneous Fault Detection and Classification for Semiconductor Manufacturing Tools," 201$^{st}$ Meeting of the Electrochemical Society, International Symposium on Plasma Processing XIV, Abs. 413, Philadelphia, PA, May 2002 (16 pages).

(Continued)

*Primary Examiner*—Albert DeCady
*Assistant Examiner*—Chad Rapp
(74) *Attorney, Agent, or Firm*—Proskauer Rose LLP

(57) ABSTRACT

A method for identifying a predetermined state of a manufacturing process by monitoring the process which involves, monitoring a plurality of variables that vary in value during the manufacturing process. The method also involves mapping as points in a hyperspace the values of each variable at a plurality of times, where the hyperspace has a number of dimensions equal to the number of variables and the number of points is equal to the plurality of times. The method also involves identifying that a manufacturing process has reached the predetermined state when one of the points reaches a closed volume in the hyperspace that is located within a predefined distance from a predefined location in the hyperspace.

15 Claims, 2 Drawing Sheets

OTHER PUBLICATIONS

Goodlin et al., "Simultaneous Fault Detection and Classification for Semiconductor Manufacturing Tools," Journal of the Electrochemical Society, 150 (12) G778-G784 (2003).

Gallagher et al., "Development and Benchmarking of Multivariate Statistical Process Control Tools for a Semiconductor Etch Process: Improving Robustness through Model Updating," Eigenvector Research, Inc., (6 pgs.) first viewed at least Sep. 9, 2004.

Chen et al., "Plasma Etch Modeling using Optical Emission Spectroscopy," J. Vac. Sci. Technol. A 14(3), May/Jun. 1996 (pp. 1901-1906).

Lymberopoulos et al., "Advanced Process Control Comes of Age," Jul. 1, 2004 http://www.reed-electronics.com/semiconductor/index.asp?layout=articlePrint&article ID= . . . (pp. 1-6).

Skumanich et al., "Advanced Etch Applications Using Tool-Level Data," Copyright 2005, PennWell Corporation, http://sst.pennet.com/articles/article_display.cfm?section=archi &article_id=206470&vers . . . , Jun. 2004 (pp. 1-7).

Mason et al., "Applying Hotelling's $T^2$ Statistic to Batch Processes," Journal of Quality Technology, vol. 33, No. 4, Oct. 2001 (pp. 466-479).

Smith et al., "Process Leaps Without New Hardware," European Semiconductor, The Source for Europe, Middle East and Africa, www.eurosemi.eu.com, Nov. 2004 (4 pages).

"TOOLweb Blue Box Professional: Enabling High Speed, Multi-User Connectivity and Data Sharing," Control & Information Technology, www.mksinst.com, Mar. 2005 (4 pages).

"TOOLweb SenseLink: Web-Enables Existing Sensors," Control & Information Technology, www.mksinst.com, Dec. 2004 (4 pages).

"TOOLweb: APC & e-Diagnostics Suite," Control & Information Technology, www.mksinst.com, Nov. 2004 (4 pages).

"TOOLweb Applications Support: AEC/APC Applications Engineering, Integration and Deployment Support," Control & Information Technology, www.mksinst.com, Sep. 2005 (4 pages).

Smith et al., "From Sensor Data to Process Control: A Networked Framework," Semiconductor Manufacturing Magazine, Jul. 2004 (6 pages).

Wold et al., "Modelling and Diagnostics of Batch Processes and Analogous Kinetic Experiments," Chemometrics and Intelligent Laboratory Systems 44 (1998) (pp. 331-340).

* cited by examiner

MANUFACTURING PROCESS END POINT DETECTION

FIELD OF THE INVENTION

The present invention relates to methods and apparatus for identifying a state of a manufacturing process and for controlling the manufacturing process.

BACKGROUND OF THE INVENTION

Historically, semiconductor device manufacturers have managed the transition to tighter process/materials specifications by depending on process tool manufacturers to design better and faster process/hardware configurations. As device geometries shrink to the nanometer scale, however, the increasing complexity of manufacturing processes has changed the landscape that must be negotiated to meet and maintain process/materials specifications.

A typical process tool used today in semiconductor manufacturing is described by a set of several thousand variables. In some cases, of these several thousand variables, there will be several hundred relevant dynamic variables. The dynamic variables (e.g., gas flow, gas pressure, delivered power, current, voltage) change based on, for example, the specific processing recipe, the step in the overall set of processing steps, or errors or faults occurring in the manufacturing process.

By way of example, if a given semi wafer manufacturing process has 200 dynamic variables that are each sampled by a data acquisition system at a rate of one sample per second (or faster) and a wafer requires 30 seconds to process, the data acquisition system will acquire 6000 data points (or more). It is quite difficult for an operator to look at the raw data traces plotted on a screen for each of the 200 variables to determine if, for example, the process is progressing properly or if a fault has occurred that would cause a defect in a specific wafer.

Meaningful application of this potential flood of data in process control is a formidable task. Simpler approaches, such as univariate statistical process control (USPC), are well established, but have limitations. USPC is effective in the observation and control of a single response parameter but advanced device fabrication requires control of multiple manufacturing variables simultaneously. Manufacturing variables typically have complex interrelationships that USPC can neither evaluate nor control.

A need therefore exists for improved systems and methods for identifying states of a manufacturing process and for controlling the manufacturing process.

SUMMARY OF THE INVENTION

The present invention features methods and systems for identifying the state of a manufacturing process and for controlling the manufacturing process.

The invention, in one aspect, features a method for identifying a predetermined state of a manufacturing process by monitoring the process. The method involves monitoring a plurality of variables that vary in value during the manufacturing process. The method also involves mapping as points in a hyperspace the values of each variable at a plurality of times, where the hyperspace has a number of dimensions equal to the number of variables and the number of points is equal to the plurality of times. The method also involves identifying that the manufacturing process has reached the predetermined state when one of the points reaches a closed volume in the hyperspace that is located within a predefined distance from a predefined location in the hyperspace.

In some embodiments, the predetermined state represents that the manufacturing process has completed the manufacturing of the product. In some embodiments, the predetermined state represents that the manufacturing process has reached an intermediate state. The method can involve calculating the distance of each point relative to the predefined location. The method can involve using a transformation method to transform a model of the manufacturing process in hyperspace into a line, the predefined location in hyperspace onto the line, and the points in hyperspace onto the line, wherein the manufacturing process has reached the predetermined state when one of the transformed points reaches a location on the line that is located within a second predefined distance from the predefined location on the line. In some embodiments, the line is one-dimensional. In some embodiments, the line has two or more dimensions.

In some embodiments, the method involves using a multivariate analysis method to project the points in the hyperspace in to a lower order hyperspace and the predefined location in the hyperspace in the lower order hyperspace, wherein the manufacturing process has reached the predetermined state when one of the points reaches a location in the lower order hyperspace that is located within a second predefined distance from the predefined location in the lower order hyperspace. In some embodiments, the method involves using a transformation method to transform the dimensions of the lower order hyperspace into a line, transform the predefined location in the lower order hyperspace onto the line, and transform the points in the lower order hyperspace onto the line, wherein the manufacturing process has reached a predetermined state when one of the transformed points in the lower order hyperspace reaches a location on the line that is located within a second predefined distance from the predefined location on the line. In some embodiments, the method involves modifying the location of the closed volume in the hyperspace based on testing a completed product.

The method can involve modifying the predefined distance based on testing a completed product. The method can involve acquiring sensor data regarding at least one variable. In some embodiments, the sensor data is acquired using at least one of, for example, a Fourier transform infrared spectrometer, a pressure sensor or a temperature sensor. In some embodiments, the method involves controlling the manufacturing process based on a location of at least one of the points in hyperspace.

The invention, in another aspect features a system for identifying a predetermined state of a manufacturing process by monitoring the process. The system includes a means for monitoring a plurality of steps for manufacturing a product wherein each step is defined by at least one variable that varies in value during the manufacturing process. The system also includes a means for mapping as points in a hyperspace the values of each variable at a plurality of times, where the hyperspace has a number of dimensions equal to the number of variables and the number of points is equal to the plurality of times. The system also includes a means for identifying that the manufacturing process has reached a predetermined state when one of the points reaches a closed volume in the hyperspace that is located within the predefined distance from a predefined location in the hyperspace.

The invention, in another aspect, features a computer program product that is tangibly embodied in an information carrier. The computer program product includes instructions being operable to cause data processing apparatus to monitor a plurality of steps for manufacturing a product wherein each step is defined by at least one variable that varies in value during the manufacturing process. The computer program product includes instructions being operable to cause data processing apparatus to map as points in a hyperspace the values of each variable at a plurality of times, where the hyperspace has a number of dimensions equal to the number of variables and the number of points is equal to the plurality of times. The computer program product also includes instructions being operable to cause data processing apparatus to identify that the manufacturing process has reached a predetermined state when one of the points reaches a closed volume in the hyperspace that is located within a predefined distance from a predefined location in the hyperspace.

BRIEF DESCRIPTION OF THE DRAWINGS

The foregoing and other objects feature and advantages of the invention, as well as the invention itself, will be more fully understood from the following illustrative description, when read together with the accompanying drawings which are not necessarily to scale.

DETAILED DESCRIPTION OF ILLUSTRATIVE EMBODIMENTS

Figure 1:
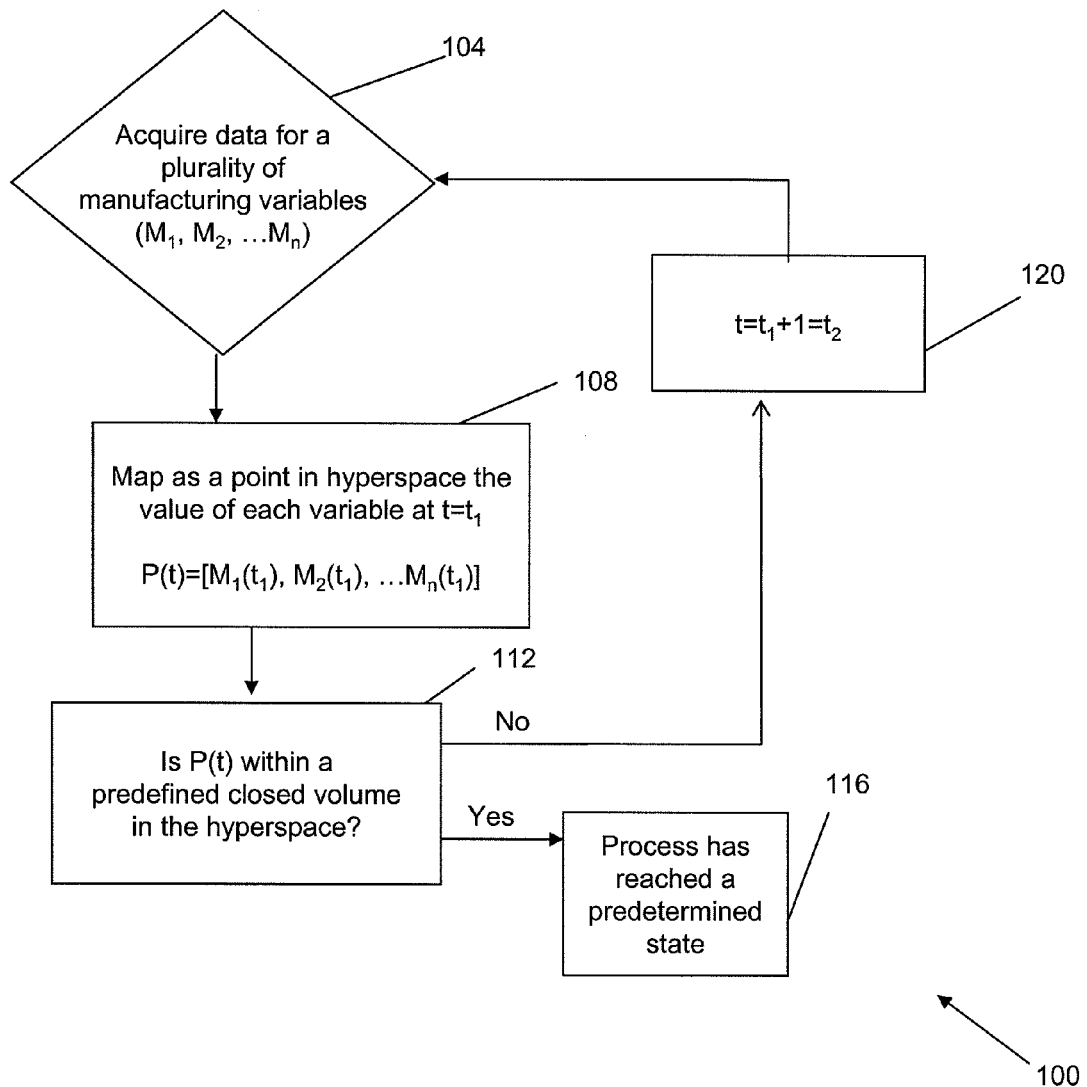
FIG. 1 is a flow diagram of a method for identifying a predetermined state of a manufacturing process, according to an illustrative embodiment of the invention.

FIG. 1 is a flow diagram 100 of a method for identifying a predetermined state of a manufacturing process, according to an illustrative embodiment of the invention. In some embodiments, the manufacturing process produces semiconductor wafers or performs one step in a process used to manufacture semiconductor wafers. The method can be implemented with, for example, a computer processor or a personal computer. In some embodiments, the method is implemented with a computer processor and the TOOLweb® product suite offered for sale by MKS Instruments, Inc. (Wilmington, Mass.).

The method involves acquiring data (step 104) for a plurality of manufacturing variables ($M_1, M_2, \ldots M_n$) that vary in value during the manufacturing process. The manufacturing variables can be, for example, process data or sensor measurements associated with manufacturing tools, processes, internal sensors and external sensors. In some embodiments, the plurality of variables are one or more states of the manufacturing process. The plurality of variables may include, for example, gas flow, gas valve position, gas or fluid temperature, gas or fluid pressure, coolant temperature, delivered power, reflected power, current, voltage, capacitance, inductance, impedance and spectrometry parameters. Data acquired for the plurality of variables may be acquired using, for example, one or more sensors (e.g., residual gas analyzer, optical emission spectrometer. Fourier transform infrared spectrometer, VI probe, particle counter, flow monitor, pressure monitor, temperature gage and self excited electron resonance spectrometer).

The method also involves mapping as a point in hyperspace (step 108) the values of each of the plurality of variables at a first point in time:

$$P(t) = [M_1(t_1), M_2(t_1), \ldots M_n(t_1)] \quad \text{EQN. 1,}$$

where P(t) is the location of the point in hyperspace [$P(t_1)$ is the location of the point in hyperspace at time $t = t_1$ (first point in time)]; $M_n(t_1)$ is the value of variable $M_n$ at time $t = t_1$; and the hyperspace is an n-dimensional space where n is the number of variables.

The method also involves determining (step 112) if the point, $P(t_1)$, is within a predefined closed volume (of n dimensions) in the hyperspace. In this embodiment, a system implementing the method, identifies that the manufacturing process has reached a predetermined state (step 116) if the point, $P(t_1)$, is within the closed volume. The predetermined state can represent, for example, that the manufacturing process has completed the manufacturing of the product. In some embodiments, the closed volume is located within a predefined distance from a predefined location in the hyperspace. The predefined location can be, for example, the location associated with the beginning of the manufacturing process.

If step 112 determines that the point, $P(t_1)$, is not within the predefined volume in the hyperspace, the system implementing the method advances to the next point in time (step 120):

$$t = t_1 + 1 = t_2 \quad \text{EQN. 2.}$$

The method then involves repeating steps 104, 108 and 112 until P(t) is determined to be within the predefined closed volume in hyperspace. In some embodiments, the closed volume is a single point in the hyperspace. In some embodiments, a closed volume larger than that of a single point is used to, for example, account for variation between products manufactured using the same process steps under the same nominal process conditions. In this case, some variation is acceptable as long as the variation remains within the predefined closed volume.

In some embodiments, the predetermined state represents that the manufacturing process has reached an intermediate state. In some embodiments, the method for identifying the predetermined state of the manufacturing process also involves calculating the distance of each point, $P(t_y)$, relative to the predefined location, where y is the number of points in time for which data is acquired (step 104).

The location of the closed volume in hyperspace can be defined based on, for example, data measurements acquired for each of the plurality of manufacturing variables ($M_1, M_2, \ldots M_n$) by testing one or more completed products (e.g., semiconductor wafers). In some embodiments, the predefined distance of the closed volume is selected based on testing one or more completed products in which, for example, metrology data is used to validate that the manufacturing process has completed the manufacturing of the product. In some embodiments, the method also involves modifying the predefined distance based on testing one or more completed products. For example, as more products are manufactured, the predefined distance can be modified to account for variation in the manufacturing process. In some embodiments, the average or weighted average of each of the plurality of manufacturing variables ($M_1, M_2, \ldots M_n$) is used to specify the predefined distance.

In some embodiments, the method also involves controlling the manufacturing process based on a location of at least one of the points in hyperspace. For example, a processor could vary one or more manufacturing parameters (e.g., increase flow of a process gas and decrease temperature in the process chamber) based on the location of the point, P(t), in the hyperspace to speed up the processing of a semiconductor wafer.

Figure 2:
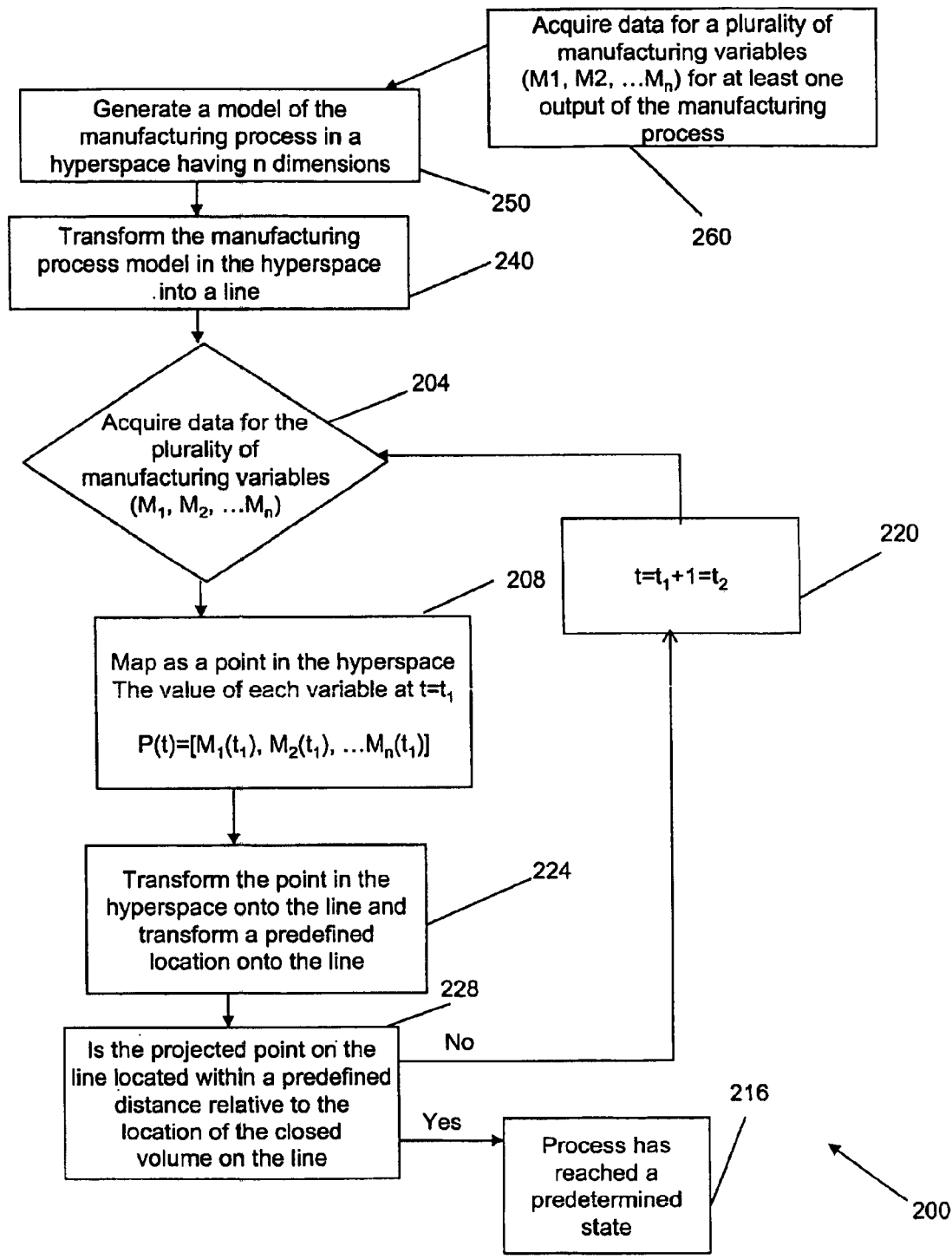
FIG. 2 is a flow diagram of a method for identifying a predetermined state of a manufacturing process, according to an illustrative embodiment of the invention.

FIG. 2 is a flow diagram 200 of a method for identifying a predetermined state of a manufacturing process, according to an illustrative embodiment of the invention. The manufacturing process has a plurality of manufacturing variables ($M_1, M_2, \ldots M_n$). Each manufacturing variable corresponds to one dimension in a hyperspace (of dimension n). The method involves acquiring data (step 260) for the plurality of manufacturing variables for at least one output of the manufacturing process. In some embodiments, data is acquired for each manufacturing variable for multiple outputs (e.g., multiple semiconductor wafers) of the manufacturing process at multiple points in time ($t_1, t_2, \ldots t_x$). Metrology data for each of the outputs is used to identify which outputs are good (e.g., satisfy a predefined performance requirement). The data for the good outputs is used to generate a model (step 250) of the manufacturing process as a function of time. Each manufacturing variable corresponds to one dimension in the hyperspace (of dimension n).

In some embodiments, an average of the values of the manufacturing variables is used to generate the manufacturing process model (step 250) as a function of time in which the model has dimension n. In some embodiments, the endpoint of the process (e.g., wafer processing is complete) is defined by the values of the manufacturing variables of the manufacturing process model at, for example, time $t_x$.

The method also involves transforming the dimensions of the manufacturing process model into a line (step 240). In some embodiments, the line is one-dimensional. In some embodiments, the line has two or more dimensions. The method involves acquiring data (step 204) for other outputs of the manufacturing process (e.g., new wafers produced) for each of the plurality of manufacturing variables ($M_1, M_2, \ldots M_n$) that vary in value during the manufacturing process. The method also involves mapping as a point in the hyperspace (step 208) the values of each of the plurality of variables at a first point in time:

$$P(t) = [M_1(t_1), M_2(t_1), \ldots M_n(t_1)] \qquad \text{EQN. 3,}$$

where P(t) is the location of the point in the hyperspace [$P(t_1)$ is the location of the point in the hyperspace at time $t=t_1$ (first point in time)]; $M_n(t_1)$ is the value of variable $M_n$ at time $t=t_1$; and the hyperspace is an n-dimensional space where n is the number of variables.

The method also involves transforming the point, $P(t_1)$, in the hyperspace onto the line and to transform the predefined location in the hyperspace onto the line (step 224). Various transformation methods can be used. In one embodiment, a weighted average of the values for each of the variables [$M_1(t_1), M_2(t_1), \ldots M_n(t_1)$] is calculated and plotted on a line as the transformation of the point, $P(t_1)$, in hyperspace onto the line. The weighted average of all the variables [$M_1(t_1), M_2(t_1), \ldots M_n(t_1)$] associated with the predefined location (e.g., beginning or initial condition of the manufacturing process) is calculated and plotted on the same line.

The method also involves determining (step 228) whether the transformed point, $P(t_1)$, has reached a predetermined location. If the transformed point, $P(t_1)$, has reached a location on the line that is located within a predefined distance from the predefined location that was projected onto the line, the manufacturing process has been completed. In the alternative, the manufacturing process has not been completed and the system implementing the method advances to the next point in time (step 220):

$$t = t_1 + 1 = t_2 \qquad \text{EQN. 4.}$$

The method involves repeating steps 204, 208, 224 and 228 until the transformed point, P(t), is determined to have reached the location on the line located within the predefined distance.

In an alternative embodiment, steps 224 and 228 involve using a multivariate analysis technique to project the points, P(t), in n-dimensional hyperspace in to a lower order hyperspace (less than n-dimensional). The method also involves projecting the predefined location in hyperspace in to the lower order hyperspace. Similarly as described herein, the manufacturing process has reached a predetermined state when one of the points ($P(t_1), P(t_2), \ldots P(t_y)$) reaches a location in the lower order hyperspace that is located within a predefined distance from the predefined location in the lower order hyperspace. In some embodiments, the method involves using a transformation method to transform the dimensions of the lower order hyperspace into a line, transform the predefined location in the lower order hyperspace onto the line, and transform the points in the lower order hyperspace onto the line, wherein the manufacturing process has reached the predetermined state when one of the transformed points in the lower order hyperspace reaches a location on the line that is located within a second predefined distance from the predefined location on the line.

By way of example, the multivariate analysis method used in step 224 can involve the Principal Component Analysis (PCA) method or the Partial Least Squares (PLS) method and be implemented using the SIMCA-P+ multivariate analysis software package (MKS Instruments, Inc., Wilmington, Mass.). The PCA or PLS method can be used to, for example, reduce the number of original manufacturing variables (n) down to k<n independent variables which are linear combinations of the manufacturing variables (n). In some embodiments, k=1.

The above-described techniques can be implemented in digital electronic circuitry, or in computer hardware, firmware, software, or in combinations of them. The implementation can be as a computer program product, e.g., a computer program tangibly embodied in an information carrier, e.g., in a machine-readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps can be performed by one or more programmable processors executing a computer program to perform functions of the invention by operating on input data and generating output. Method steps can also be performed by, and apparatus can be implemented as, special purpose logic circuitry, e.g., an FPGA (field programmable gate array) or an ASIC (application-specific integrated circuit). Modules can refer to portions of the computer program and/or the processor/special circuitry that implements that functionality.

Processors suitable for the execution of a computer program include, by way of example, both general and special purpose microprocessors, and any one or more processors of any kind of digital computer. Generally, a processor receives instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Data transmission and instructions can also occur over a communications network.

Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in special purpose logic circuitry.

The terms "module" and "function," as used herein, mean, but are not limited to, a software or hardware component which performs certain tasks. A module may advantageously be configured to reside on addressable storage medium and configured to execute on one or more processors. A module may be fully or partially implemented with a general purpose integrated circuit ("IC"), FPGA, or ASIC. Thus, a module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and modules may be combined into fewer components and modules or further separated into additional components and modules. To provide for interaction with a user, the above described techniques can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer (e.g., interact with a user interface element). Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The above described techniques can be implemented in a distributed computing system that includes a back-end component, e.g., as a data server, and/or a middleware component, e.g., an application server, and/or a front-end component, e.g., a client computer having a graphical user interface and/or a Web browser through which a user can interact with an example implementation, or any combination of such back-end, middleware, or front-end components. The components of the system can be interconnected by any form or medium of digital data communications, e.g., a communications network. Examples of communications networks, also referred to as communications channels, include a local area network ("LAN") and a wide area network ("WAN"), e.g., the Internet, and include both wired and wireless networks. In some examples, communications networks can feature virtual networks or sub-networks such as a virtual local area network ("VLAN"). Unless clearly indicated otherwise, communications networks can also include all or a portion of the publicly-switched telephone network ("PSTN"), for example, a portion owned by a specific carrier.

Variations, modifications, and other implementations of what is described herein will occur to those of ordinary skill in the art without departing from the spirit and the scope of the invention and are considered to be encompassed thereby. Accordingly, the invention is not to be defined only by the preceding illustrative description.

The invention claimed is:

1. A method for identifying a predetermined state of a manufacturing process by monitoring the process, comprising:

monitoring a plurality of variables that vary in value during the manufacturing process;

mapping as points in a hyperspace the values of each variable at a plurality of times, where the hyperspace has a number of dimensions equal to the number of variables and the number of points is equal to the plurality of times;

using a multivariate analysis method to project the points in the hyperspace in to a lower order hyperspace and the predefined location in the hyperspace in to the lower order hyperspace; and identifying that the manufacturing process has reached the predetermined state when one of the points reaches a location in the lower order hyperspace that is located within a predefined distance from the predefined location in the lower order hyperspace.

2. The method of claim 1, wherein the predetermined state represents that the manufacturing process has completed the manufacturing of a product.

3. The method of claim 1, wherein the predetermined state represents that the manufacturing process has reached an intermediate state.

4. The method of claim 1, comprising calculating the distance of each point relative to the predefined location.

5. The method of claim 1, comprising using a transformation method to transform in the dimensions of the lower order hyperspace into a line, transform the predefined location in the lower order hyperspace onto the line, and transform the points in the lower order hyperspace into a line, wherein the manufacturing process has reached the predetermined state when one of the transformed points in the lower order hyperspace reaches a location on the line that is located within a second predefined distance from the predefined location on the line.

6. The method of claim 1, comprising modifying a predefined location of the closed volume in the hyperspace based on testing a completed product.

7. The method of claim 1, comprising modifying the predefined distance based on testing a completed product.

8. The method of claim 1, comprising acquiring sensor data regarding the at least one variable.

9. The method of claim 8, wherein the sensor data is acquired using at least one of a Fourier transform infrared spectrometer, a pressure sensor or a temperature sensor.

10. The method of claim 1, comprising controlling the manufacturing process based on a location of at least one of the points in hyperspace.

11. A system for identifying a predetermined state of a manufacturing process by monitoring the process, comprising:

means for monitoring a plurality of steps for manufacturing a product wherein each step is defined by at least one variable that varies in value during the manufacturing process;

means for mapping as points in a hyperspace the values of each variable at a plurality of times, where the hyperspace has a number of dimensions equal to the number of variables and the number of points is equal to the plurality of times;

means for projecting the points in the hyperspace in to a lower order hyperspace and the predefined location in the hyperspace in to the lower order hyperspace; and means for identifying that the manufacturing process has reached a predetermined state when one of the points reaches a location in the lower order hyperspace that is located within a predefined distance from the predefined location in the lower order hyperspace.

12. A computer program product, tangibly embodied in an information carrier, the computer program product including instructions being operable to cause data processing apparatus to:
- monitor a plurality of steps for manufacturing a product wherein each step is defined by at least one variable that varies in value during the manufacturing process;
- map as points in a hyperspace the values of each variable at a plurality of times, where the hyperspace has a number of dimensions equal to the number of variables and the number of points is equal to the plurality of times;
- use a multivariate analysis method to project the points in the hyperspace in to a lower order hyperspace and the predefined location in the hyperspace in to the lower order hyperspace; and
- identify that the manufacturing process has reached a predetermined state when one of the points reaches a location in the lower order hyperspace that is located within a predefined distance from a predefined location in the lower order hyperspace.

13. A method for identifying a predetermined state of a manufacturing process by monitoring the process, comprising:
- monitoring a plurality of variables that vary in value during the manufacturing process;
- mapping as points in a hyperspace the values of each variable at a plurality of times, where the hyperspace has a number of dimensions equal to the number of variables and the number of points is equal to the plurality of times;
- using a transformation method to transform a model of the manufacturing process in hyperspace into a line, the predetermined location in the hyperspace onto the line, and the points in hyperspace to transformed points on the line;
- identifying that the manufacturing process has reached the predetermined state when one of the points reaches a location in the lower order hyperspace that is located within a predefined distance from the predefined location on the line.

14. A system for identifying a predetermined state of a manufacturing process by monitoring the process, comprising:
- means for monitoring a plurality of steps for manufacturing a product wherein each step is defined by at least one variable that varies in value during the manufacturing process;
- means for mapping as points in a hyperspace the values of each variable at a plurality of times, where the hyperspace has a number of dimensions equal to the number of variables and the number of points is equal to the plurality of times;
- means for transforming a model of the manufacturing process in hyperspace into a line, the predefined location in the hyperspace onto the line, and the points in hyperspace to transformed points on the line;
- means for identifying that the manufacturing process has reached a predetermined state when one of the transformed points reaches a location on the line that is located within a predefined distance from the predefined location on the line.

15. A computer program product, tangibly embodied in an information carrier, the computer program product including instructions being operable to cause data processing apparatus to:
- monitor a plurality of steps for manufacturing a product wherein each step is defined by at least one variable that varies in value during the manufacturing process;
- map as points in a hyperspace the values of each variable at a plurality of times, where the hyperspace has a number of dimensions equal to the number of variables and the number of points is equal to the plurality of times;
- using a transformation method to transform a model of the manufacturing process in hyperspace into a line, the predefined location in the hyperspace onto the line, and the points in hyperspace to transformed points on the line;
- identify that the manufacturing process has reached a predetermined state when one of the transformed points reaches a location on the line that is located within a predefined distance from a predefined location on the line.

* * * * *

UNITED STATES PATENT AND TRADEMARK OFFICE
CERTIFICATE OF CORRECTION

| | | |
|---|---|---|
| PATENT NO. | : 7,630,786 B2 | Page 1 of 1 |
| APPLICATION NO. | : 11/683218 | |
| DATED | : December 8, 2009 | |
| INVENTOR(S) | : Hendler et al. | |

It is certified that error appears in the above-identified patent and that said Letters Patent is hereby corrected as shown below:

In claim 5, column 8, line 26, please replace "in the dimensions" with "the dimensions".

In claim 5, column 8, line 29, please replace "into" with "onto".

In claim 6, column 8, lines 35-36, please delete the word "predefined".

In claim 12, column 9, line 19, please replace "from a predefined location" with "from the predefined location".

In claim 13, column 9, line 33, please replace "predetermined" with "predefined".

In claim 13, column 9, line 37, please add "predetermined" before "points".

In claim 13, column 9, line 38, please replace "location in the lower order hyperspace" with "location on the line".

In claim 15, column 10, line 40, please replace "distance from a" with "distance from the".

Signed and Sealed this
Twelfth Day of April, 2011

David J. Kappos
*Director of the United States Patent and Trademark Office*